US009889559B2

(12) United States Patent
Muttik

(10) Patent No.: US 9,889,559 B2
(45) Date of Patent: Feb. 13, 2018

(54) ROBOTIC SYSTEM FOR UPDATING DEVICES

(71) Applicant: Intel Corporation, Santa Clara, CA (US)

(72) Inventor: Igor Muttik, Aylesbury (GB)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,228

(22) Filed: Jun. 26, 2015

(65) Prior Publication Data

US 2016/0375579 A1 Dec. 29, 2016

(51) Int. Cl.
| | |
|---|---|
| *G06F 19/00* | (2011.01) |
| *G05B 19/04* | (2006.01) |
| *G05B 19/18* | (2006.01) |
| *B25J 9/16* | (2006.01) |
| *H04L 29/08* | (2006.01) |
| *H04W 4/00* | (2018.01) |
| *H04W 4/02* | (2018.01) |
| *B64C 39/02* | (2006.01) |

(52) U.S. Cl.
CPC .............. *B25J 9/161* (2013.01); *B25J 9/1664* (2013.01); *B64C 39/024* (2013.01); *H04L 67/18* (2013.01); *H04L 67/34* (2013.01); *H04W 4/001* (2013.01); *H04W 4/021* (2013.01); *H04W 4/008* (2013.01); *Y10S 901/06* (2013.01); *Y10S 901/09* (2013.01)

(58) Field of Classification Search
None
See application file for complete search history.

(56) References Cited

U.S. PATENT DOCUMENTS

| | | | | |
|---|---|---|---|---|
| 4,809,178 A | * | 2/1989 | Ninomiya ............ | G05D 1/0255 318/587 |
| 5,216,605 A | * | 6/1993 | Yardley ................ | G05D 1/0261 180/168 |
| 5,363,305 A | * | 11/1994 | Cox ........................ | G01C 21/00 700/253 |

(Continued)

OTHER PUBLICATIONS

Samsung Electronics' New NFC Chip with Embedded Flash Offers Increased RF Performance in a Small Package, http://www.samsung.com/global/business/semiconductor/news-events/press-releases/detail?newsId=13741, Oct. 8, 2014, 1 page.

(Continued)

*Primary Examiner* — Bhavesh V Amin
(74) *Attorney, Agent, or Firm* — Grossman, Tucker, Perreault & Pfleger, PLLC

(57) ABSTRACT

In one embodiment the present disclosure provides a robotic updating apparatus that includes mapping circuitry to provide movement instructions, the mapping circuitry including map data; wherein the map data includes a defined area for the robotic updating apparatus; movement circuitry to receive the movement instructions and to control movement of the robotic apparatus within the defined area; wherein movement is based on, at least in part, the movement instructions; device discovery circuitry to discover at least one target device within the defined area; and update circuitry to provide update for at least one target device; wherein the device discovery circuitry also to communicate the update to the at least one target device.

21 Claims, 5 Drawing Sheets

(56) References Cited

U.S. PATENT DOCUMENTS

| | | | | |
|---|---|---|---|---|
| 5,537,017 | A * | 7/1996 | Feiten | G01S 15/89 318/568.12 |
| 5,548,516 | A * | 8/1996 | Gudat | G01S 19/11 701/23 |
| 5,610,815 | A * | 3/1997 | Gudat | G08G 1/202 318/587 |
| 5,938,704 | A * | 8/1999 | Torii | G05D 1/0227 180/168 |
| 6,374,155 | B1 * | 4/2002 | Wallach | G05D 1/0274 700/245 |
| 6,408,226 | B1 * | 6/2002 | Byrne | G05D 1/0246 318/568.11 |
| 6,442,476 | B1 * | 8/2002 | Poropat | G01S 5/16 701/23 |
| 6,469,628 | B1 * | 10/2002 | Richards | G01S 13/42 340/539.1 |
| 6,539,294 | B1 * | 3/2003 | Kageyama | E02F 3/842 180/168 |
| 7,170,252 | B2 * | 1/2007 | Maeki | G05D 1/0274 180/168 |
| 7,429,843 | B2 * | 9/2008 | Jones | G05D 1/0219 318/568.1 |
| 7,430,455 | B2 * | 9/2008 | Casey | G05D 1/0238 15/319 |
| 7,587,260 | B2 * | 9/2009 | Bruemmer | G05D 1/0088 318/567 |
| 7,668,621 | B2 * | 2/2010 | Bruemmer | G05D 1/0088 318/568.12 |
| 7,801,644 | B2 * | 9/2010 | Bruemmer | G06N 3/008 318/568.17 |
| 8,364,309 | B1 * | 1/2013 | Bailey | G06N 3/008 700/245 |
| 8,380,349 | B1 * | 2/2013 | Hickman | G05D 1/0246 700/247 |
| 9,233,472 | B2 * | 1/2016 | Angle | H04L 12/282 |
| 9,250,081 | B2 * | 2/2016 | Gutmann | G05D 1/0231 |
| 2003/0234730 | A1 * | 12/2003 | Arms | H02J 17/00 340/870.01 |
| 2005/0060069 | A1 * | 3/2005 | Breed | B60N 2/2863 701/408 |
| 2008/0009965 | A1 * | 1/2008 | Bruemmer | G05D 1/0088 700/245 |
| 2009/0030551 | A1 * | 1/2009 | Hein | G05D 1/024 700/253 |
| 2013/0214727 | A1 * | 8/2013 | Teng | H02J 7/0052 320/107 |

OTHER PUBLICATIONS

Texas Instruments, TRF7970A Multi-Protocol Fully Integrated 13.56-MHz NFC/RFID Transceiver IC, http://www.ti.com/product/trf7970A, 3 pages.

\* cited by examiner

400

```
┌─────────────────────────────────────┐
│   Moving a Robot Within a Defined Area  │
│                                     │
│                 402                 │
└─────────────────────────────────────┘
                  │
                  ▼
┌─────────────────────────────────────┐
│ Discovering, by the Robot, At least One Target Device │
│                                     │
│                 404                 │
└─────────────────────────────────────┘
                  │
                  ▼
┌─────────────────────────────────────┐
│ Providing, by the Robot, An Update to the At Least One │
│              Target Device          │
│                                     │
│                 406                 │
└─────────────────────────────────────┘
                  │
                  ▼
┌─────────────────────────────────────┐
│ Augmenting Map Data of A Defined Area To Include │
│ Information Associated With A Location of the │
│ Discovered Target Device and Information Associated │
│ with the Update Communicated to the Discovered │
│              Target Device          │
│                                     │
│                 408                 │
└─────────────────────────────────────┘
```

FIG. 4

ROBOTIC SYSTEM FOR UPDATING
DEVICES

FIELD

The present disclosure relates to a robotic system for updating devices.

BACKGROUND

As it is expected that the number of connected Internet of Things (IoT) devices will grow, the cost and efficacy considerations are likely going to dictate that many embedded devices will never have permanent connectivity—often because they have to run on a battery or other limited energy source (e.g. solar, wind, water flow, etc.). These devices may contain critical bugs, they can be compromised, etc., and it is therefore important that they receive firmware/software updates. For unconnected embedded devices (like toasters, plant watering devices, valves, locks, etc.) or those designed to only provide one-way upstream communications (like weather records, various meters/sensors, etc.) the problem of updating may become critical. For example, a battery-operated lock may have a security problem which may be fixed via a firmware update. Or a robotic vacuum may get a software update to improve the cleaning algorithms and prolong per-charge cleaning cycles. Or an electric meter may use outdated cryptography functions which must be refreshed to maintain confidentiality.

Many modern system-on-chip (SoC) designs (for example, SoC suppliers like Samsung (http://www.samsung.com/global/business/semiconductor/news-events/press-releases/detail?newsId=13741), Texas Instruments (http://www.ti.com/product/trf7970A), etc.) contain a CPU with a flash storage updateable via near-field communications (NFC). However, delivering updates to a multitude of such home or industrial IoT devices is problematic, even if NFC allows updating without physically disassembling the device. The problems lay in finding all devices (can be dozens in a home environment and up to thousands in a factory or millions in a city) that require updating and then fetching and applying correct updates. With a growing number of unconnected devices a scalable automated updating solution will be required. There are no known solutions for this problem—unconnected devices generally stay un-updated (with the assumption that their factory testing is adequate for indefinite use and so the algorithms in firmware will stay permanently adequate). General (but incorrect) assumption is that unconnected devices are primitive and therefore fully testable at the factory, and are at low risk of attack and may be cheaply replaced—hence, there is no need to invest in updating them. These assumptions are not always correct, and there is growing understanding that most electronic devices may be required to be updatable (or have limited lifetime; which may be wasteful and inefficient).

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 4 illustrates a flowchart of operations of a robotic update system according to another embodiment of the present disclosure.

Although the following Detailed Description will proceed with reference being made to illustrative embodiments, many alternatives, modifications, and variations thereof will be apparent to those skilled in the art.

DETAILED DESCRIPTION

The present disclosure relates to a mobile robot system for updating/servicing devices. In some examples described herein, a robot (e.g., ground based and/or flying robot) is configured to move close to a target device and interrogate the device to determine if the device needs updating, and if so, obtain appropriate update code, and communicate the update to the target device. The communication between the robot and the target device may be accomplished using near-field communication (NFC) techniques, remote communications techniques, direct coupling, etc. The target device may be a device that is not equipped with network communication abilities and/or may only be capable of one-way communication. In addition, the target devices may be physically moved (e.g., by a human or by machine), or they may have a built-in capability to move, so the exact location of each target device is not always known. The robot may be configured to generate a map of one or more target devices within an area of interest using, for example, GPS coordinates, {x,y} coordinates, {x,y,z} coordinates, etc. to enable the robot to periodically move to the one or more target devices for updating. In some examples, the robot may be configured to receive a map of an area of interest from a remote source. The robot system described herein may be deployed in a home environment to provide updating of target devices within and around the home. In addition, the robot system described herein may be configured for large-scale deployment in industrial areas (e.g., oil fields, warehouses, etc.), government installations (e.g., municipal water systems, electric grids, sewer installations, road grids, military/defense areas, etc.), etc.

Figure 1:
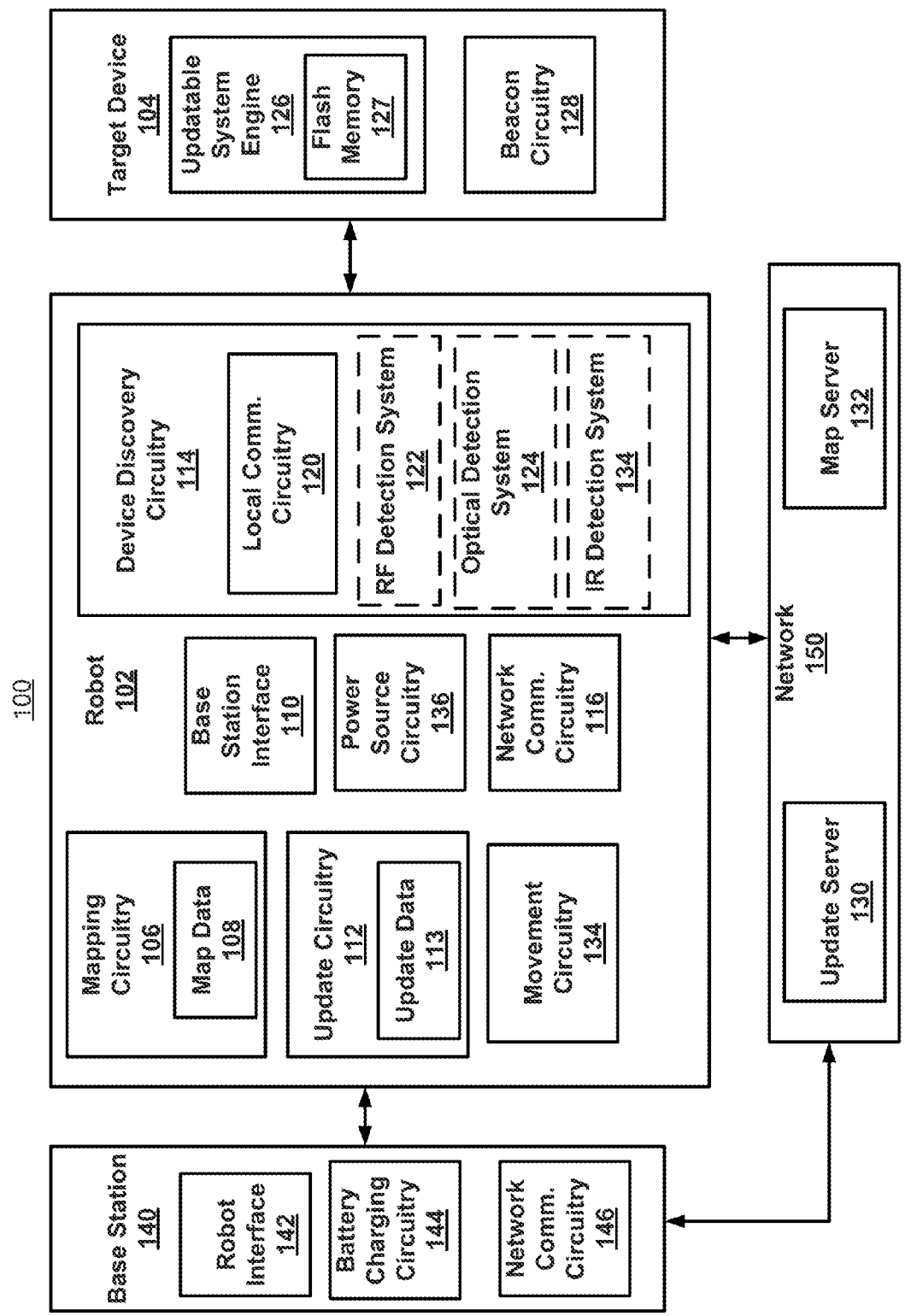
FIG. 1 illustrates a robotic update system consistent with several embodiments of the present disclosure.

FIG. 1 illustrates a robotic update system 100 consistent with several embodiments of the present disclosure. The system 100 includes a robot 102, at least one target device 104, and a base station 140. The robot 102 is generally configured to move toward the target device 104 and provide an update to the target device 104, as will be described in detail below. The target device 104 may include a system engine 126 that, at least in some embodiments described herein, is capable of being updated. "Update" and "update data", as used herein, may be generally defined as one or more instructions that a target device 104 may utilize, for example, to improve the overall functionality of the target device 104 and/or to bring the target device 104 (or a portion thereof) up-to-date. Such an update may include, for example, software/firmware instructions for security, functionality and/or performance enhancements for the target device 104. In addition, in some embodiments an update may also include recharging of a power source (e.g., batteries, not shown) associated with the target device 104. In the examples described herein, the target device 104 may be generally updatable, but may not have the ability to receive updates from conventional sources, e.g., via a WiFi/Internet connection. In other words, the target device 104 may be unconnected from conventional communications sources, and thus, does not have the inherent ability to receive an update. The target device 104 may include any type of electronic device, for example, a valve, lock, meter, sensor, etc., and of course, these are provided only as a small example of the types of target devices that may be utilized by the description herein, and the present disclosure is not intended to be limited to any particular type of target device 104.

The target device may include a system engine 126 that may include, for example, one or more system-on-chip (SoC) devices that include flash memory 127 that is updatable using, for example, a near-field communication (NFC) protocol and/or other short-range, medium-range or long-range wireless communications protocol. The system engine 126, during operation may emit electromagnetic signals (e.g., strobe signals, clock pulse signals, etc.) that may be sensed by the robot 102 to identify the system engine 126 as an updatable device, using for example, a NFC protocol. Such electromagnetic signals may be used to uniquely identify the type of target device, and may further be used to provide information as to how the target device 104 may be updated. In some embodiments, the target device 104 may emit a modulated visible, infrared or high-energy signal which carries information related to the type of system engine 126. Such information may include, for example, device identification, manufacturer, model, serial number, service identifier, release time, etc. In some embodiments, the target device 104 may include a beacon circuitry 128 configured to generate a beacon signal to assist and/or enable the robot 102 to home in on the location of the target device 104. The beacon signal generated by the beacon circuitry 128 may include identifier information and/or location information and in some embodiments, may include information as to the capabilities and/or status of the target device 102.

The robot 102 may include a movement circuitry 134 to enable the robot 102 to move within a defined area. The movement circuitry 134 may include, for example, controller systems for propulsion systems (e.g., motor, gas/liquid/reactive propulsion, etc.), controller systems for one or more wheels/tracks (e.g., in the case of a ground-based robot) and/or one or more rotors/propellers (e.g., in the case of a flying robot (e.g., quad-copter drone, etc.)), and/or other systems and/or sub-systems to enable the robot 102 to move within a defined area. The robot 102 may also include a power source circuitry 136 to deliver energy to various systems and/or subsystems of the robot 102, such as, for example, the movement circuitry 134 and/or other circuitry described herein. In some embodiments, the power source circuitry 136 may include one or more rechargeable energy sources like, for example, battery systems (which may include associated controller circuitry, etc.).

The robot 102 may also include a mapping circuitry 106 configured to host map data 108 of a defined area for the robot 102. In some embodiments, the mapping circuitry may be configured to generate the map data 108 based on, for example, movement within a defined area. In other embodiments, the mapping circuitry 108 may be configured to receive the map data 106 from a remote and/or external source (such as from network 150 and/or base station 140, described below). In some embodiments, the map data 108 may provide a general defined area within which the robot 102 will move within, and as one or more target devices 104 are discovered by the robot 102, the mapping circuitry 106 is configured to augment the map data 108 with the location of the discovered one or more target devices 104. Mapping circuitry 106 is also configured to generate movement instructions to the movement circuitry 134 to enable the robot 102 to move to a general and/or specified location. Depending on, for example, the specifications of the robot 102, the mapping circuitry 106 may generate map data 108 in a two-dimensional format (e.g., using {x, y} coordinates) and/or a three-dimensional format (e.g., using {x, y, z} coordinates) and/or other coordinate system such as global positioning system (GPS) coordinates, etc. For example, the mapping circuitry 106 may provide instructions to the movement circuitry 134 to move within the defined area on a random basis or pseudo-random basis to enable the robot 102 to discover one or more target devices 104, and/or to move to specified locations of known and/or previously-mapped target devices 104 within the defined area. In some embodiments the map data 108 may be received from the device 104, while in other embodiments the mapping circuitry 106 may generate the map data 108 based on, for example, GPS data, route details, distance traveled from a base station, velocity, timing, direction of movements, etc. Once a target device 104 is discovered (described in more detail below), the mapping circuitry 106 may augment the map data 108 with the coordinates of the target device 104, so that the robot 102 may be enabled to acquire a target device 104 more efficiently in the future. In addition, the mapping circuitry 106 may provide instructions to the movement circuitry 132 to move the robot to within a defined distance from a target device 104, to enable, for example, discovery of and/or communication with the target device 104. In some examples, one or more target devices 104 within a defined area may be programmed to move around within the defined area to, for example, one or more defined or pre-programmed locations. In such examples, the mapping circuitry 106 may also be configured, during successive discovery of a target device 104, to track the movement of one or more target devices 104 and may also be configured to anticipate where a given target device 104 will be at a given time, based on, for example, movement pattern recognition, etc. In other embodiments, the map data 108 may be provided to the robot 102 (e.g., from a base station, remote network server, etc., as described below) that includes the location and/or coordinates and/or timing of one or more target devices 104 within a defined roaming area for the robot 102. Map data 108 may also include information related to the update status of at least one device 104.

The robot 102 may also include device discovery circuitry 114 configured to discover one or more target devices and to communicate with one or more target devices 104. In one example embodiment, the device discovery circuitry 114 may include local communications circuitry 120 configured to discover at least one target device and communicate with at least one target device based on a short-range communication protocol. In some examples provided herein, the local communications circuitry 120 may include circuitry that complies or is compatible with a near-field communications (NFC) protocol, such as radio-frequency identifications (RFID) standards (e.g., ISO/IEC 14443, ISO/IEC 18092, ECMA-340, ISO/IEC 21481, ECMA-352, FeliCa, etc.) to enable the robot 102 to discover one or more target devices 104 and to communicate an update to one or more target devices 104. In other embodiments, the local communication circuitry 120 may be configured to communicate with a target device 104 using other wireless communication techniques such as, infra-red link, optical link, sound waves, etc., and/or wired communication techniques such as an electrical/mechanical connection interface, etc. In some embodiments, to provide discovery of at least one target device 104, the local communications circuitry 120 may be configured to sense the operation of at least a portion of the system engine 126 of the target device 104. For example, as described above, the local communications circuitry 114 may be configured to sense electromagnetic signals emitted by the target device 104 to identify the location of the target device 104, identify the type of target device 104, etc. To that end, the local communications circuitry 120 may provide instructions to the mapping circuitry 106 to indicate that the local communications circuitry 120 has detected a target device 104. In some examples, and depending on the range to the target device 104 and/or signal strength of the local communications circuitry 120, once a target device 104 is potentially identified, the mapping circuitry 106 may provide instructions to the movement circuitry 134 to move the robot 102 closer to the target device 104 to allow, for example, the local communications circuitry 120 to "home in" on the target device and establish a stable communication link with the target device 104. If the location of the target device 104 is not already known and mapped by the mapping circuitry 106, the local communications circuitry 114 may instruct the mapping circuitry 106 to augment the map data 108 with the location of the discovered target device 104 to enable, for example, the robot 102 to move directly to discovered target device 104 in the future.

While the local communications circuitry 120 as described above may be adequate for discovering target devices in certain locations and having certain features, there may be instances where the local communications circuitry 120 is unable to properly discover a target device 104 (if, for example, the target device is partially hidden, or is in an area with competing electronic noise, etc.). Therefore, in one embodiment, the device discovery circuitry 114 may include an RF detection system 122 configured to detect RF signals of at least one target device 104. The RF detection system 122 may include an RF sensor (not shown) and related control circuitry (also not shown) to detect an RF signal that may be emitted by a target device 104. To that end, as described above, the beacon circuitry 128 of the target device 104 may emit an RF signal that is sensed by the RF detection system 122 to identify the type and location of the target device 104. In one embodiment, the RF emissions of the target device may allow the robot 102 to pinpoint its location via triangulation method in which multiple robots may cooperatively create a mesh and determine the location of the device 104 by measuring relative distances through signal strength or via propagation latencies. In another embodiment, the device discovery circuitry 114 may include an optical detection system 124 configured to detect at least one target device 104 based on optical information. The optical detection system 122 may include an optical sensor (e.g., camera, not shown) and related control circuitry (also not shown) to detect a target device 104 based on an image of the target device 104 and/or the surrounding environment of the target device 104. The optical detection system 122 may also include a device recognition system (not shown) configured to parse image data and determine if a target device 104 is contained within an image based on, for example, device size, device shape, surrounding environment, etc. In another embodiment, the device discovery circuitry 114 may include an infrared (IR) detection system 134 configured to detect at least one target device 104 based on IR information. The IR detection system 134 may include an IR sensor (not shown) and related control circuitry (also not shown) to detect a target device 104 based on an IR signature of the target device 104 and/or the surrounding environment of the target device 104. The device discovery circuitry 120 may also be configured to provide the mapping circuitry 106 with the location of any discovered target devices. In some embodiments the robot 102 may recognize the target device 104 by analyzing its visual image (e.g. size, color, labels, barcode, QR-code, etc.) captured via any suitable visual sensor or by recognizing the properties of the device 104 communications (e.g., spectrum, transmission packet appearance and content) as well as its environment (e.g. an electric meter device may be discoverable near electric wires).

The robot 102 may also include an update circuitry 112 configured to update one or more target devices 104 with update data 113. The update circuitry 112 may store one or more updates for one or more target devices 104. In operation, when the robot 102 is moved to within the communication range of the device discovery circuitry 114, the update circuitry 112 may begin to communicate the update data 113 to the target device 104. The update circuitry 112 may instruct the device discovery circuitry 120 to communicate with the target device 104 using a communications protocol that complies with the target device 104. The update circuitry 112 may be configured to receive update data 113 from the network 150 and/or from the base station 140, as described below.

The device discovery circuitry 114 may also be configured to determine if the at least one target device 104 is battery operated, and if so, if the energy source of the at least one target device 104 is rechargeable. If rechargeable, the update circuitry 112 may generate update data 113 that includes instructions for recharging the target device 104 by applying an energy transfer from the power source circuitry 138 to the target device 104 to recharge (at least in part) one or more energy sources (batteries, capacitors, etc.) of the target device 104. To that end, the device discovery circuitry 114 may also include charging circuitry (not shown) to enable recharging of the target device 104. The charging circuitry may include, for example, inductor-coupling wireless charging, physical connection charging, etc. The charging circuitry may include controller circuitry to control a specific type of energy source associated with the target device 104.

The robot 102 may also include a network communications circuitry 116 configured to communicate with a network 150. The network communications circuitry 116 and the network 150 may communicate with each other using a switched fabric communications protocol, for example, an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. Of course, in other embodiments, the network communications circuitry 116 may communicate with network 150 using other network protocols which may include a custom and/or proprietary network communications protocol and/or other communication protocols (e.g. GSM, 3G, LTE, 4G, Bluetooth, NFC, etc.). The network 150 may include (or may be connected to) an update server 130 and/or a map server 132. The update server 130 may include one or more updates for one or more target devices 104. The map server 132 may include map data 108 (or portions thereof) for use by the mapping circuitry 106. The map data 108 may include location information for one or more target devices 104 and/or a generalized area within which the robot 102 may roam.

The system 100 may also include a base station 140 that may generally be used as a docking point and/or launch point for the robot 102. The base station 140 may include a robot interface circuitry 142 configured to interface with the robot 102 to enable, for example, exchange of commands and data with the robot 102, battery charging, etc. The robot interface circuitry 142, in some embodiments may include a wireless interface to communicate with the robot 102. In other embodiments, the robot interface circuitry 142 may include physical and electrical connection points to electronically couple the base station 140 to the robot 102. Similarly, the robot 102 may include a corresponding base station interface circuitry 110 to enable wireless and/or physical coupling between the robot 102 and the base station 140. The base station 140 may also include a battery charging circuitry 144 to provide charging and recharging of the power source circuitry 136 of the robot 102. The battery charging circuitry 144 may include, for example, inductive (wireless) based charging circuitry, or charging through a physical connection of the robot interface circuitry 142. In one embodiment the robot 102 may be configured to charge/recharge the power source circuitry 136 from the environment via solar panel(s), wind, etc. The base station 140 may also include a network communication circuitry 146, similar to network communication circuitry 116, to enable the base station 140 to exchange commands and data with the network 150. In operation, the base station 120 may provide map data 108 to the robot 102 that includes the location of the base station 140. This may enable, for example, the robot 102 to roam within a defined area (as defined by map data 108) until the power source is close to being depleted, and the mapping circuitry 106 may then instruct the robot 102 to return to the base station 140 for recharging of the power source circuitry 136. In one embodiment, the map circuitry 106 may include one or more rules to determine how far from the base station 140 the robot 102 is allowed to roam (depending on for example, the map data 108, e.g., the density of the target devices 104 near the robot 102 and/or the most efficient or "best" route to undertake to visit the target devices 104) to allow safe return for recharging. In addition, while "docked" with the base station 140, the base station 140 may load update data 113 into the robot. In addition, the base station 140 may be configured to download information from the robot 102, such as information related to the identity and type of one or more discovered target devices 104, update status of one more target devices 104, power consumption for the robot 102 to complete or partially complete one or more target devices 104 within the defined roaming area, coordinate information related to one or more target devices 104 within the defined roaming area, coordinate with other robots (which may share the same base station 140 or operate from their own in any suitable manner) etc. In another embodiment the mobile robot 102 may be used to deliver energy to target devices 104. Recharging devices 104 by the robot 102 may be accomplished via a wired connection or wirelessly. The map data 108 may carry meta-data about the target devices 104 specifying their battery capacity and/or expected/predicted level of charge. The map circuitry 108 may also include rules to plan a route to prioritize the devices 104 which need charging.

Figure 2:
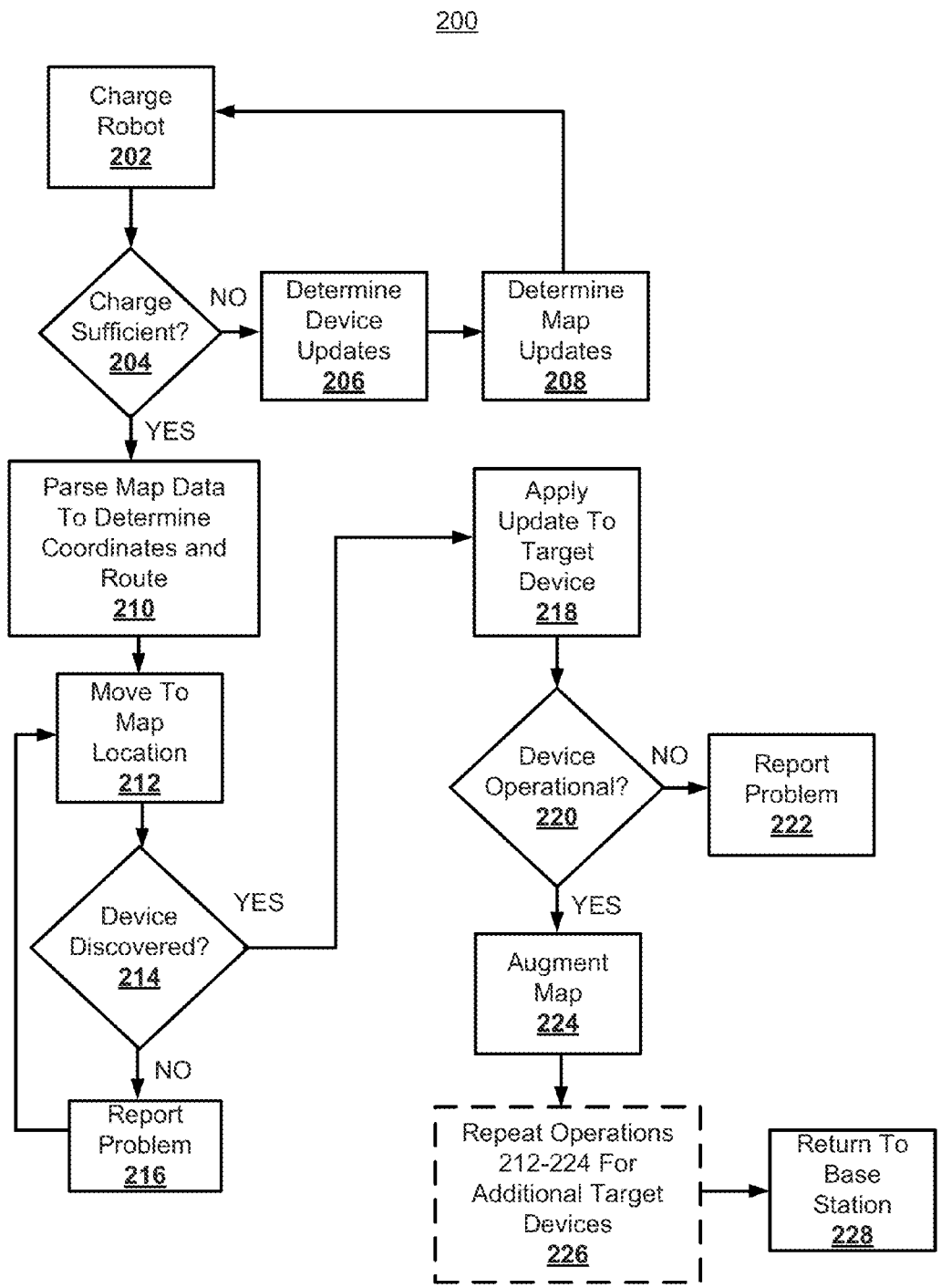
FIG. 2 illustrates a flowchart of operations of a robotic update system according to one embodiment of the present disclosure.

FIG. 2 illustrates a flowchart 200 of example operations of a robotic update system consistent with one embodiment of the present disclosure. In this embodiment, an update robot moves within a defined area to provide at least one update to a target device with a known location. With continued reference to FIG. 1, operations of this embodiment may include charging a robot at a base station 202, and determining if the charge level is sufficient for roaming operations within a defined area 204. Sufficiency of charge may be determined, for example, by power requirement data received from the update robot for previous trips within the defined area, anticipated power requirements for the number of target devices within a defined area, complete battery charge, etc. If charge level is insufficient, operations may include determining, for one or more known and mapped target devices if updates are available 206, and/or determining if a map update is available 208 for one or more target devices. If the charge level is sufficient 204, operations may include parsing map data to determine if there are coordinates for pre-defined and/or previously-mapped target devices 210, and if so, at 212 operations may include providing the robot instructions to move to one or more pre-defined and/or previously mapped coordinates. In this example, movement of the robot may be in a plane for a ground-based robot and/or in three dimensions for a flying robot. Operations of this embodiment may also include attempting to discover the target device 214 to determine if the target device is available for an update, once the robot is within, for example, a predefined proximity to the target device. Discovery of a target device may be based on, for example, NFC communications between the robot and the target device and/or additional discovery techniques such as RF discovery, IR discovery, optical discovery, etc. Communication between the robot and the target device may include an NFC protocol and/or other short-range communication protocol. If the device is undiscoverable (e.g., off-line or otherwise unavailable) at the specified coordinates 214, operations may include reporting a problem of a failed communication 216. The robot may be configured to report the problem to the base station and/or to a server system in communication with the robot. A failed communication may mean that the target device is not operational or that the target device has moved. In either case, the map may be augmented to note the problem with the target device. If the device is available 214, operations may include applying an update to the target device 218 by communicating the update to the target device. Once the update is complete, operations may also include determining if the target device is operational 220, and if not, operations may also include reporting a problem with the target device 222, similar to operation 216. If the device is operational after the update 220, operations may also include augmenting the map 224 to note that the target device has a current update applied. In this case, map augmentation may include, for example, a time/date stamp of when an update is applied to the target device, and/or version of the update applied to the target device, etc. Operations may further include repeating the operations 212-224 for additional, mapped target devices within the mapped area 226. Operations may also include returning to the base station 228, for example, when all of the mapped target devices have been visited and serviced, to recharge the batteries, etc.

Figure 3:
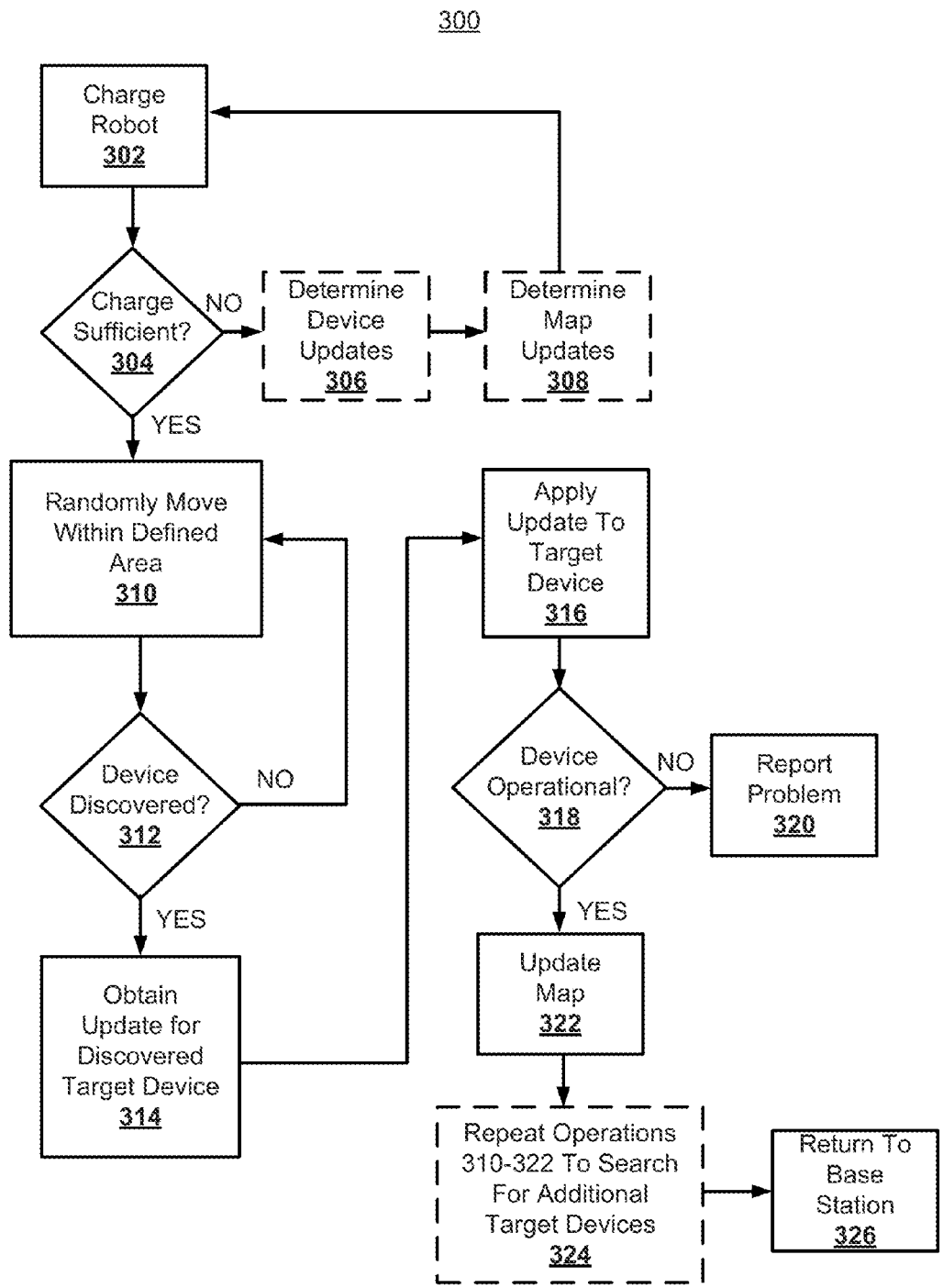
FIG. 3 illustrates a flowchart of operations of a robotic update system according to another embodiment of the present disclosure.

FIG. 3 illustrates a flowchart 300 of example operations of a robotic update system consistent with another embodiment of the present disclosure. In this embodiment, an update robot moves randomly (and/or pseudo-randomly) within a defined area to discover at least one target device and to provide at least one update to at least one target device within the defined area. With continued reference to FIG. 1, operations of this embodiment may include charging a robot at a base station 302, and determining if the charge level is sufficient for roaming operations within a defined area 304. Sufficiency of charge may be determined, for example, by power requirement data received from the update robot for previous trips within the defined area, anticipated power requirements for the number of target devices within a defined area, complete battery charge, etc. The required charge level of the robot may also account for the need to recharge at least one target device. If charge level is insufficient, operations may include determining, for one or more known and mapped target devices if updates are available 306, and/or determining if a map update is available 308 for one or more target devices. If the charge level is sufficient 304, operations may include randomly moving within a pre-defined map area 310. In this example, movement of the robot may be in a plane for a ground-based robot and/or in three dimensions for a flying robot. Operations of this embodiment may also include attempting to discover the target device 312 to determine if the target device is available for an update, once the robot is within, for example, a predefined proximity to the target device. Discovery of a target device may be based on, for example, NFC communications between the robot and the target device and/or additional discovery techniques such as RF discovery, IR discovery, optical discovery, etc. Discovery of a target device may yield device identification characteristics such as the type of updatable firmware, manufacturer information, battery state information, etc. Communication between the robot and the target device may include an NFC protocol and/or other short-range communication protocol. If no target device is discovered 312, operations may include continuing random movement within the map area to attempt to discover a target device. If a target device is discovered 312, operations may also include obtaining an update for the discovered target device 314. To that end, the robot may be configured to communicate with an update server and/or with the base station to obtain an update for the discovered target device. If an update is found for the discovered target device, operations may also include applying the update to the target device 316 by communicating the update to the target device. Once the update is complete, operations may include determining if the target device is operational 318, and if not, operations may also include reporting a problem of a failed target device 320. The robot may be configured to report the problem to the base station and/or to a server system in communication with the robot. If the target device is operational after the update 318, operations may also include augmenting the map 322 to note that the location of the discovered target device and that the target device has a current update applied. In this case, map augmentation may include, for example, coordinates of the device, time/date stamp and/or version of the update, etc. Operations may further include repeating the operations 310-322 to discover additional target devices within the mapped area 324. Operations may also include returning to the base station 326, for example, upon complete investigation of the defined area (or subset thereof), to recharge the batteries, etc.

FIG. 4 illustrates a flowchart 400 of example operations of a robotic update system consistent with another embodiment of the present disclosure. This embodiment provides updating at least one target device in a defined area. With continued reference to FIG. 1, operations of this embodiment include moving a robot within a defined area 402. Operations of this embodiment may also include discovering, by the robot, the at least one target device 404. Operations may also include providing, by the robot, an update to the at least one target device 406. Operations may also include augmenting map data of the defined area to include information associated with the location of the discovered target device and information associated with the update data communicated to the discovered target device 408.

While FIGS. 2-4 illustrate operations according to specific embodiments, it is to be understood that not all of the operations depicted in FIGS. 2, 3 and/or 4 are necessary for other embodiments. Indeed, it is fully contemplated herein that in other embodiments of the present disclosure, the operations depicted in FIGS. 2-4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Figure 5:
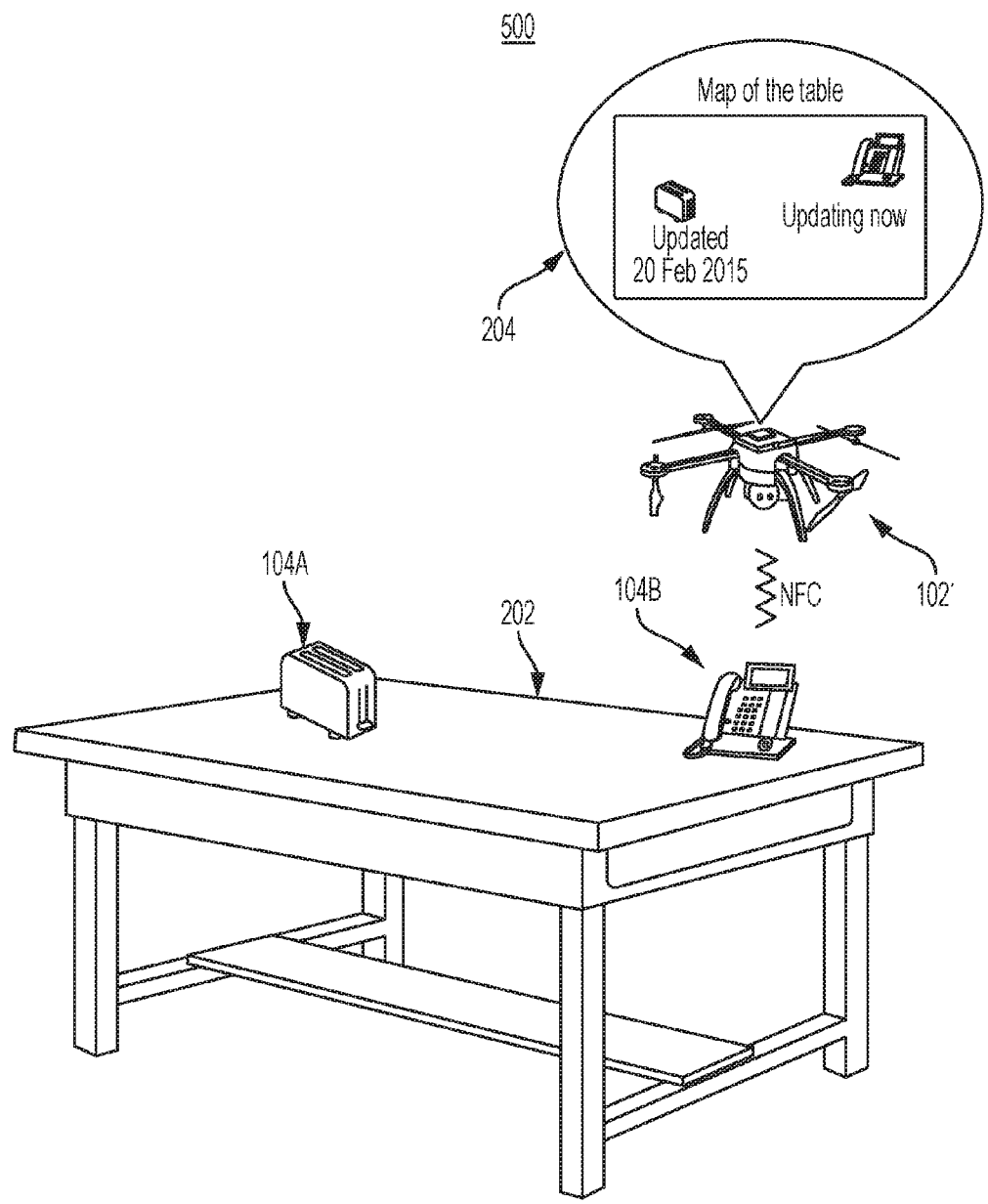
FIG. 5 illustrates an example environment for a robotic update system consistent with at least one embodiment of the present disclosure.

FIG. 5 illustrates an example environment 500 for a robotic update system consistent with at least one embodiment of the present disclosure. The system of this embodiment depicts a robot 102', in this example a flying robot (e.g., quad-copter, etc.), roaming in an environment that includes a table 202 and a first target device 104A (e.g., toaster) and a second target device 104B (e.g., telephone). In the example environment, the robot 102' is positioned in proximity to the telephone 104B and communicating with the telephone 104B using an NFC communications protocol. The robot 102' provides update data to the telephone 104'. The robot 102' records the time and date of an update provided to the toaster 104A, and also monitors the updating status of the telephone 104B (depicted at 204). For example, while being recharged at a docking station, the mobile robot 102' may receive a push update (e.g. via WiFi) for the firmware of the phone 104B and this event may cause the robot 102' to initiate a service update of the phone 104B.

While the foregoing description and drawings depict a single update robot for updating one or more target devices, it is to be understood that multiple robots may be used in a given map area/environment. In such an embodiment, the robots may be configured to communicate with one another to coordinate updating of devices within the defined area. Such data sharing may be useful for robots operating in overlapping areas. In addition, while the mapping circuitry 106 may provide "course" and "fine" movement instructions to the movement circuitry 134 to enable the robot to "home in" on a target device 104, there may be instances where environmental conditions prevent such movement (for example, an obstruction, etc.). Accordingly, the robot 102 may also include movement sensor circuitry (not shown) to provide movement feedback to the movement circuitry 134. In such an example, the movement sensor circuitry may include visual and/or IR sensors to sense environmental conditions, accelerometers, position sensors, etc., and/or other systems and/or subsystems to enable the robot to identify and possibly overcome specific environmental conditions. In addition, an update, as described herein generally includes a software/firmware update and/or a power source charge/recharge. However, in other embodiments, an update may include services of a target device, for example, adding fuel/oil, tightening/loosening nuts/bolts, and/or other service items that may be accomplished by a robot.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Any of the operations described herein may be implemented in a system that includes one or more storage devices having stored thereon, individually or in combination, instructions that when executed by one or more processors perform one or more operations. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

EXAMPLES

Examples of the present disclosure include subject material such as a method, means for performing acts of the method, a device, or of an apparatus or system related to robotic updating, as discussed below.

Example 1

According to this example there is provided a robotic updating apparatus. The apparatus includes mapping circuitry to provide movement instructions, the mapping circuitry including map data; wherein the map data includes a defined area for the robotic updating apparatus; movement circuitry to receive the movement instructions and to control movement of the robotic apparatus within the defined area; wherein movement is based on, at least in part, the movement instructions; device discovery circuitry to discover at least one target device within the defined area; and update circuitry to provide update for at least one target device; wherein the device discovery circuitry also to communicate the update to the at least one target device.

Example 2

This example includes the elements of example 1, and further includes network communication circuitry to communicate with at least one network server to obtain at least one of the map data or data associated with the update.

Example 3

This example includes the elements of example 1, wherein device discovery circuitry includes local communications circuitry to discover and communicate with the at least one target device using a Near Field Communication (NFC) communications protocol; wherein the NFC communications protocol to detect signals associated with the operation of the at least one target device.

Example 4

This example includes the elements according to any one of examples 1 through 3, wherein the device discovery circuitry includes a radio frequency (RF) detection system to detect a radio frequency of the at least one target device.

Example 5

This example includes the elements according to any one of examples 1 through 3, wherein the device discovery circuitry includes an optical detection system to detect an optical characteristic of the at least one target device.

Example 6

This example includes the elements according to any one of examples 1 through 3, wherein the device discovery circuitry includes an infrared (IR) detection system to detect an infrared characteristic of the at least one target device.

Example 7

This example includes the elements according to any one of examples 1 through 6, further comprising power source circuitry to provide power, at least in part, to the movement circuitry.

Example 8

This example includes the elements according to example 1, wherein the update includes information related to at least one of a security, functionality and/or performance enhancements associated with the at least one target device.

Example 9

This example includes the elements according to any one of examples 1 through 8, wherein the device discovery circuitry also to determine at least one of a type of updatable firmware associated with the at least one target device, manufacturer information associated with the at least one target device, or battery state information associated with the at least one target device.

Example 10

This example includes the elements of example 1, wherein the device discovery circuitry to detect the at least one target device using at least one of infrared detection, radio frequency detection or optical detection.

Example 11

This example includes the elements of example 10, wherein the optical features include bar code information.

Example 12

According to this example there is provided a method for updating at least one target device in a defined area. This method includes moving a robot within the defined area; discovering, by the robot, the at least one target device; providing, by the robot, an update to the at least one target device; and augmenting map data of the defined area to include information associated with the location of the discovered target device and information associated with the update communicated to the discovered target device.

Example 13

This example includes the elements according to example 12, wherein the discovering includes detecting, by the robot, signals from an updatable system engine associated with the at least one target device.

Example 14

This example includes the elements according example 12, wherein the discovering includes detecting, by the robot, the at least one target device using at least one of infrared detection, radio frequency detection or optical detection.

Example 15

This example includes the elements of example 12, wherein movement of the robot within the defined area is based on random movement.

Example 16

This example includes the elements of example 12, wherein movement of the robot is based on coordinates of the at least one target device included with the map data.

Example 17

This example includes the elements according example 12, and further includes determining the status of the discovered target device after the update data is communicated to the discovered target device.

Example 18

This example includes the elements according example 12, and further includes communicating with at least one network server to obtain the map data and data associated with the update.

Example 19

This example includes the elements according example 12, wherein the update includes information related to at least one of a security, functionality and/or performance enhancements associated with the at least one target device.

Example 20

This example includes the elements according example 12, wherein the at least one target device includes a rechargeable energy source and the update includes a transfer of energy to recharge the rechargeable energy source of the at least one target device.

Example 21

This example includes a computer readable storage device having stored thereon instructions that when executed by one or more processors result in the following operations including:
the method according to any one of example 12 to 20.

Example 22

This example includes a system including at least one device arranged to perform the method of any one of claims 12 to 20.

Example 23

This example includes a device that includes means to perform the method of any one of claims 12 to 20.

Example 24

According to this example there is provided a robotic update system. The system includes a robot including: mapping circuitry to provide movement instructions, the mapping circuitry including map data; wherein the map data includes a defined area for the robot; movement circuitry to receive the movement instructions and to control movement of the robot within the defined area; wherein movement is based on, at least in part, the movement instructions; device discovery circuitry to discover at least one target device within the defined area; update circuitry to provide update for at least one target device; wherein the device discovery circuitry also to communicate the update to the at least one target device; and power source circuitry to provide power to the mapping circuitry, movement circuitry, update circuitry and local communications circuitry; and a base station to couple to the robot to provide, at least in part, recharging of the power source circuitry.

Example 25

This example includes the elements of example 24, wherein the discovering includes detecting, by the robot, signals from an updatable system engine associated with the at least one target device.

Example 26

This example includes the elements of example 24, and further includes network communication circuitry to communicate with at least one network server to obtain the map data or data associated with update.

Example 27

This example includes the elements of example 24, wherein device discovery circuitry includes local communications circuitry to discover and communicate with the at least one target device using a Near Field Communication (NFC) communications protocol; wherein the NFC communications protocol to detect signals associated with the operation of the at least one target device.

Example 28

This example includes the elements of example 24, wherein the update includes information related to at least one of a security, functionality and/or performance enhancements associated with the at least one target device.

Example 29

This example includes the elements of example 24, wherein the at least one target device includes a rechargeable energy source and the update includes a transfer of energy to recharge the rechargeable energy source of the at least one target device.

Example 30

This example includes the elements of example 24, wherein the device discovery circuitry to detect the at least one target device using at least one of infrared detection, radio frequency detection or optical detection.

Example 31

This example includes the elements according to example 24, wherein the device discovery circuitry includes a radio frequency (RF) detection system to detect a radio frequency of the at least one target device.

Example 32

This example includes the elements according to example 24, wherein the device discovery circuitry includes an optical detection system to detect an optical characteristic of the at least one target device.

Example 33

This example includes the elements according to example 24, wherein the device discovery circuitry includes an infrared (IR) detection system to detect an infrared characteristic of the at least one target device.

Example 34

This example includes the elements according example 24, wherein the device discovery circuitry also to determine at least one of a type of updatable firmware associated with the at least one target device, manufacturer information associated with the at least one target device, or battery state information associated with the at least one target device.

Example 35

This example provides a computer readable storage device having stored thereon instructions that when executed by one or more processors result in the following operations comprising:
provide movement of a robot within the defined area;
discover, by the robot, the at least one target device;
provide, by the robot, an update to the at least one target device; and
augment map data of the defined area to include information associated with the location of the discovered target device and information associated with the update communicated to the discovered target device.

Example 36

This example includes the elements according to example 35, wherein the discovering includes detect, by the robot, signals from an updatable system engine associated with the at least one target device.

Example 37

This example includes the elements according example 35, wherein the discovering includes detect, by the robot, the at least one target device using at least one of infrared detection, radio frequency detection or optical detection.

Example 38

This example includes the elements of example 35, wherein movement of the robot within the defined area is based on random movement.

Example 39

This example includes the elements of example 35, wherein movement of the robot is based on coordinates of the at least one target device included with the map data.

Example 40

This example includes the elements according example 35, wherein the instructions that when executed by one or more processors results in the following additional operations including determine the status of the discovered target device after the update data is communicated to the discovered target device.

Example 41

This example includes the elements according example 35, wherein the instructions that when executed by one or more processors results in the following additional operations including communicate with at least one network server to obtain the map data and data associated with the update.

Example 42

This example includes the elements according example 35, wherein the update includes information related to at least one of a security, functionality and/or performance enhancements associated with the at least one target device.

Example 43

This example includes the elements according example 35, wherein the at least one target device includes a rechargeable energy source and the update includes a transfer of energy to recharge the rechargeable energy source of the at least one target device.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A robotic updating apparatus comprising:
mapping circuitry to provide movement instructions, the mapping circuitry including map data; wherein the map data includes a defined area for the robotic updating apparatus;
movement circuitry to receive the movement instructions and to control movement of the robotic apparatus within the defined area; wherein movement is based on, at least in part, the movement instructions;
device discovery circuitry to discover at least one target device within the defined area, wherein the discovery includes determining at least a type of updatable firmware in the at least one target device; and
update circuitry to provide update for at least one target device; wherein the device discovery circuitry also to communicate the update to the at least one target device, wherein the update includes firmware instructions to update the firmware for at least one of a security, functionality or performance enhancements for the at least one target device.

2. The robotic updating apparatus of claim 1, further comprising a network communication circuitry to communicate with at least one network server to obtain at least one of the map data or data associated with the update.

3. The robotic updating apparatus of claim 1, wherein device discovery circuitry includes local communications circuitry to discover and communicate with the at least one target device using a Near Field Communication (NFC) communications protocol; wherein the NFC communications protocol to detect signals associated with the operation of the at least one target device.

4. The robotic updating apparatus of claim 1, further comprising power source circuitry to provide power, at least in part, to the movement circuitry.

5. The robotic updating apparatus of claim 1, wherein the at least one target device includes a rechargeable energy source and the update includes a transfer of energy to recharge the rechargeable energy source of the at least one target device.

6. The robotic updating apparatus of claim 1, wherein device discovery circuitry also to determine at least one of a type of updatable firmware associated with the at least one target device, manufacturer information associated with the at least one target device, or battery state information associated with the at least one target device.

7. The robotic updating apparatus of claim 1, wherein the device discovery circuitry to detect the at least one target device using at least one of infrared detection, radio frequency detection or optical detection.

8. A method for updating at least one target device in a defined area, comprising:
moving a robot within the defined area;
discovering, by the robot, the at least one target device, wherein the discovering includes determining at least a type of updatable firmware in the at least one target device;
providing, by the robot, an update to the at least one target device, wherein the update includes firmware instructions to update the firmware for at least one of a security, functionality or performance enhancements for the at least one target device; and
augmenting map data of the defined area to include information associated with the location of the discovered target device and information associated with the update communicated to the discovered target device.

9. The method of claim 8, wherein the discovering includes detecting, by the robot, signals from an updatable system engine associated with the at least one target device.

10. The method of claim 8, wherein the discovering includes detecting, by the robot, the at least one target device using at least one of infrared detection, radio frequency detection or optical detection.

11. The method of claim 8, wherein movement of the robot within the defined area is based on random movement.

12. The method of claim 8, wherein movement of the robot is based on coordinates of the at least one target device included with the map data.

13. The method of claim 8, further comprising determining the status of the discovered target device after the update data is communicated to the discovered target device.

14. The method of claim 8, further comprising communicating with at least one network server to obtain the map data and data associated with the update.

15. The method of claim 8, wherein the at least one target device includes a rechargeable energy source and the update includes a transfer of energy to recharge the rechargeable energy source of the at least one target device.

16. A robotic update system, comprising:
a robot including: mapping circuitry to provide movement instructions, the mapping circuitry including map data; wherein the map data includes a defined area for the robot; movement circuitry to receive the movement instructions and to control movement of the robot within the defined area; wherein movement is based on, at least in part, the movement instructions; device discovery circuitry to discover at least one target device within the defined area, wherein the discovery includes determining at least a type of updatable firmware in the at least one target device; update circuitry to provide update for at least one target device wherein the update includes firmware instructions to update the firmware for at least one of a security, functionality or performance enhancements for the at least one target device wherein the device discovery circuitry is also to communicate the update to the at least one target device; and power source circuitry to provide power to the mapping circuitry, movement circuitry, update circuitry and local communications circuitry; and
a base station to couple to the robot to provide, at least in part, recharging of the power source circuitry.

17. The system of claim 16, wherein the discovering includes detecting, by the robot, signals from an updatable system engine associated with the at least one target device.

18. The system of claim 16, further comprising a network communication circuitry to communicate with at least one network server to obtain the map data or data associated with update.

19. The system of claim 16, wherein device discovery circuitry includes local communications circuitry to discover and communicate with the at least one target device using a Near Field Communication (NFC) communications protocol; wherein the NFC communications protocol to detect signals associated with the operation of the at least one target device.

20. The system of claim 16, wherein the at least one target device includes a rechargeable energy source and the update includes a transfer of energy to recharge the rechargeable energy source of the at least one target device.

21. The system of claim 16, wherein the device discovery circuitry to detect the at least one target device using at least one of infrared detection, radio frequency detection or optical detection.

* * * * *